United States Patent
Yang

(10) Patent No.: US 10,747,056 B2
(45) Date of Patent: Aug. 18, 2020

(54) LIQUID CRYSTAL DISPLAY, LOW BLUE LIGHT DISPLAY CONTROL SYSTEM THEREOF AND DISPLAY METHOD FOR LOW BLUE LIGHT

(71) Applicant: Wuhan China Star Optoelectronics Technology Co., Ltd., Wuhan, Hubei (CN)

(72) Inventor: Yong Yang, Hubei (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 362 days.

(21) Appl. No.: 15/752,202

(22) PCT Filed: Jan. 17, 2018

(86) PCT No.: PCT/CN2018/073059
§ 371 (c)(1),
(2) Date: Feb. 12, 2018

(87) PCT Pub. No.: WO2019/127710
PCT Pub. Date: Jul. 4, 2019

(65) Prior Publication Data
US 2020/0159074 A1    May 21, 2020

(30) Foreign Application Priority Data
Dec. 27, 2017   (CN) .......................... 2017 1 1448953

(51) Int. Cl.
*G09G 3/34* (2006.01)
*G02F 1/13357* (2006.01)

(52) U.S. Cl.
CPC .. *G02F 1/133621* (2013.01); *G02F 1/133603* (2013.01); *G09G 3/3413* (2013.01)

(58) Field of Classification Search
CPC ... G02F 1/133603; G02F 2001/133614; G02F 2001/133624; G02F 2202/36;
(Continued)

(56) References Cited

U.S. PATENT DOCUMENTS

| 9,368,696 B1* | 6/2016 | Murofushi | .............. H01L 33/50 |
| 2010/0289814 A1* | 11/2010 | Hsieh | ................... G09G 3/2003 345/602 |

(Continued)

FOREIGN PATENT DOCUMENTS

| CN | 104865746 A | 8/2015 |
| CN | 105573311 A | 5/2016 |

(Continued)

*Primary Examiner* — Rodney Amadiz
(74) *Attorney, Agent, or Firm* — Hemisphere Law, PLLC; Zhigang Ma

(57) ABSTRACT

The present invention provides a liquid crystal display, a low blue light display control system and a display method for low blue light. The display method for a low blue light of a liquid crystal display comprising the steps of: performing division of a backlight source to obtain a plurality of backlight locations, wherein the plurality of backlight locations comprises a first emission peak and a second emission peak, and the second emission peak is larger than the second emission peak; calculating blue light ratios corresponding to display images of each backlight location of the plurality of backlight locations, respectively, and obtaining the blue light ratio of each backlight location; and driving a first light emission peak and/or a second light emission peak in the backlight location according to the blue light ratio of each backlight location for not shifting the white point coordinate and decreasing the display color gamut.

10 Claims, 3 Drawing Sheets

(58) Field of Classification Search
CPC ......... G02F 1/133602; G02F 1/133617; G02F 1/133621; G09G 3/3406; G09G 3/3426; G09G 3/36; G09G 3/3607; G09G 3/3413; H01L 33/507; H01L 25/0753
See application file for complete search history.

(56) References Cited

U.S. PATENT DOCUMENTS

| | | | |
|---|---|---|---|
| 2016/0091758 A1* | 3/2016 | Yoneyama | G02F 1/133603 349/69 |
| 2016/0129218 A1 | 5/2016 | Mok et al. | |
| 2016/0201858 A1* | 7/2016 | Kang | G02B 6/005 349/71 |
| 2019/0103523 A1* | 4/2019 | Choi | H01L 33/504 |
| 2019/0139479 A1* | 5/2019 | He | G02F 1/1336 |

FOREIGN PATENT DOCUMENTS

| | | |
|---|---|---|
| CN | 105788474 A | 7/2016 |
| CN | 106782317 A | 5/2017 |
| CN | 107121837 A | 9/2017 |

* cited by examiner

LIQUID CRYSTAL DISPLAY, LOW BLUE LIGHT DISPLAY CONTROL SYSTEM THEREOF AND DISPLAY METHOD FOR LOW BLUE LIGHT

RELATED APPLICATIONS

The present application is a National Phase of International Application Number PCT/CN2018/073059, filed Jan. 17, 2018, and claims the priority of China Application 201711448953.4, filed Dec. 27, 2017.

FIELD OF THE DISCLOSURE

The disclosure relates to a liquid crystal display technical field, and more particularly to a liquid crystal display, a low blue light display control system thereof and a display method for low blue light.

BACKGROUND

The blue light of the display will cause human visual fatigue and injury have reached a consensus in the medical community. In order to reduce the visual hazard of the blue light of the display to the human eye, people have done a lot of efforts. Overall, there are mainly two ways of software and hardware: wherein, the software mode is gradually not accepted by the market due to the yellowishness of the image. The hardware mode is mainly realized by changing the light emission wavelength of the blue light of the backlight and the matched color filter photoresist, taking into consideration the white point coordinate and the color of the display in the hardware mode, the limit position of the blue light backlight in the blue peak only in the vicinity of 460 nm, the further redshift of the blue light wave peak will result in reduced display color gamut and shift of the white point color coordinate, and is not conducive to enhance the taste of the display image. Currently, there is not a very good solution to this situation.

SUMMARY

In order to solve the insufficiency of the conventional technology, the present invention provides a liquid crystal display, a low blue light display control system and a low blue light display method capable of reducing the short-wave blue light energy while ensuring that the white point coordinate do not shift, and the display color gamut does not decreased.

A specific technical solution proposed by the present invention is to provide a low blue light display method for a liquid crystal display, the low blue light display method including the steps of:

Performing division of a backlight source to obtain a plurality of backlight locations, wherein the plurality of backlight locations includes a first emission peak and a second emission peak, and the second emission peak is larger than the second emission peak;

Calculating blue light ratios corresponding to display images of each backlight location of the plurality of backlight locations, respectively, and obtaining the blue light ratio of each backlight location; and Driving a first light emission peak and/or a second light emission peak in the backlight location according to the blue light ratio of each backlight location.

Alternatively, the first emission peak is 457~465 nm, and the second emission peak is 466~475 nm.

Alternatively, the step of driving the first light emission peak and/or the second light emission peak in the backlight location according to the blue light ratio of each backlight location specifically includes:

Judging whether the blue light ratio of each backlight location is greater than a first threshold;

Driving the second light emission peak in the backlight location, if the blue light ratio of the backlight location is greater than the first threshold;

Judging whether the blue light ratio of the backlight location is greater than a second threshold, if the blue light ratio of the backlight location is not greater than the first threshold;

Driving the first light emission peak and the second light emission peak in the backlight location, if the blue light ratio of the backlight location is greater than the second threshold; and Driving the first light emission peak in the backlight location, if the blue light ratio of the backlight location is not greater than the second threshold.

Alternatively, the step of driving the first light emission peak and the second light emission peak in the backlight location, if the blue light ratio of the backlight location is greater than the second threshold specifically includes:

Judging whether the blue light ratio of the backlight location is greater than a third threshold;

If the blue light ratio of the backlight location is greater than the third threshold, driving the first light emission peak in the backlight location according to a first pulse sequence, and driving the second light emission peak in the backlight location according to a second pulse sequence, a duty ratio of the first pulse sequence is smaller than the duty ratio of the second pulse sequence; and If the blue light ratio of the backlight location is not greater than the third threshold, driving the first light emission peak in the backlight location according to the third pulse sequence, and driving the second light emission peak in the backlight location according to the fourth pulse sequence, the duty ratio of the third pulse sequence is greater than the duty ratio of the fourth pulse sequence.

Alternatively, the step of driving the first light emission peak and the second light emission peak in the backlight location, if the blue light ratio of the backlight location is greater than the second threshold specifically includes:

Judging whether the blue light ratio of the backlight location is greater than the third threshold;

If the blue light ratio of the backlight location is greater than the third threshold, driving the first light emission peak in the backlight location according to a fifth pulse sequence, and driving the second light emission peak in the backlight location according to a sixth pulse sequence, a duty ratio of the fifth pulse sequence is equal to the duty ratio of the sixth pulse sequence, an intensity of the fifth pulse sequence is less than the intensity of the sixth pulse sequence; and If the blue light ratio of the backlight location is not greater than the third threshold, driving the first light emission peak in the backlight location according to a seventh pulse sequence, and driving the second light emission peak in the backlight location according to an eighth pulse sequence, the duty ratio of the seventh pulse sequence is equal to the duty ratio of the eighth pulse sequence, an intensity of the seventh pulse sequence is greater than the intensity of the eighth pulse sequence.

The present application further provides a low blue light display control system of a liquid crystal display, including:

A division module configured to divide a backlight source to obtain a plurality of backlight locations, wherein the plurality of backlight locations includes a first emission peak and a second emission peak, and the second emission peak is larger than the second emission peak;

A calculating module configured to calculate blue light ratios corresponding to display images of each backlight location of the plurality of backlight locations, respectively, and obtaining the blue light ratio of each backlight location; and A driving module configured to drive a first light emission peak and/or a second light emission peak in the backlight location according to the blue light ratio of each backlight location.

The present application further provides a liquid crystal display, the liquid crystal display includes a backlight source and a low blue light display control system as described above, the backlight source includes a plurality of first light emitting units and a plurality of second light emitting units, the first light emitting units includes first blue light chips, the second light emitting units includes second blue light chips, an emission peak of the second blue light chips is larger than the emission peak of the first blue light chips.

Alternatively, the first emission peak is 457~465 nm, and the second emission peak is 466~475 nm.

Alternatively, the plurality of first light emitting units and the plurality of second light emitting units are arranged in a matrix, and the first light emitting units and the second light emitting units are alternately arranged.

Alternatively, the first light emitting unit includes a first blue light chip, the second light emitting unit includes a second blue light chip, or the second light emitting unit includes two first blue light chips, and the second light emitting unit includes two second blue light chips.

In the display method for the low blue light of a liquid crystal display provided by the present invention, by performing division of a backlight source, calculating blue light ratios corresponding to display images of each backlight location of the plurality of backlight locations, respectively, and driving a first light emission peak and/or a second light emission peak in the backlight location according to the blue light ratio of each backlight location, wherein the second emission peak is larger than the second emission peak, thereby ensuring that the white point coordinate is not shifted and the display color gamut does not decrease.

DETAILED DESCRIPTION OF PREFERRED EMBODIMENTS

Figure 1:
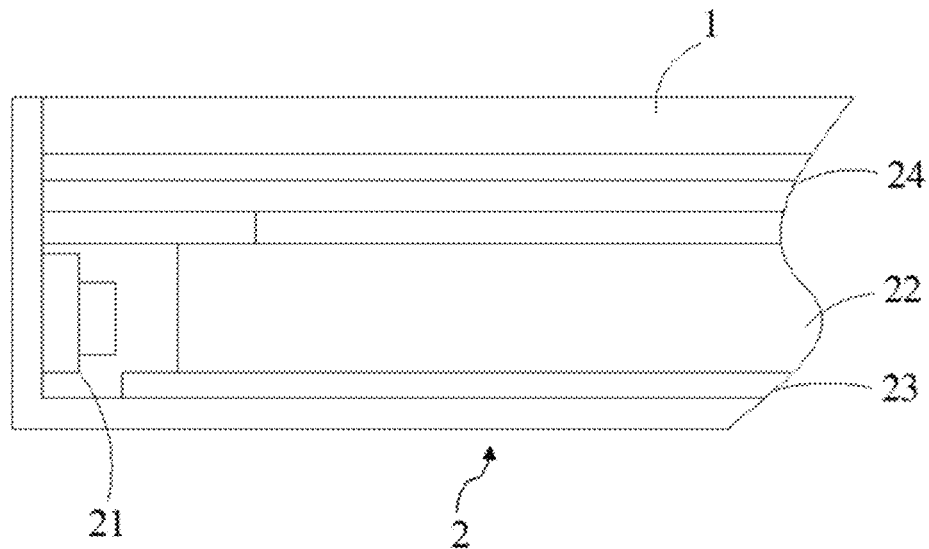
FIG. 1 is a schematic structural view of a liquid crystal display.

Hereinafter, embodiments of the present invention will be described in detail with reference to the accompanying drawings. However, the invention may be embodied in many different forms and should not be construed as limited to the specific embodiments set forth herein. Rather, these embodiments are provided to explain the principles of the invention and its practical application to thereby enable those of ordinary skill in the art to understand various embodiments of the invention and various modifications as are suited to the particular use contemplated. In the drawings, the same reference numerals will always be used to refer to the same elements.

Figure 2:
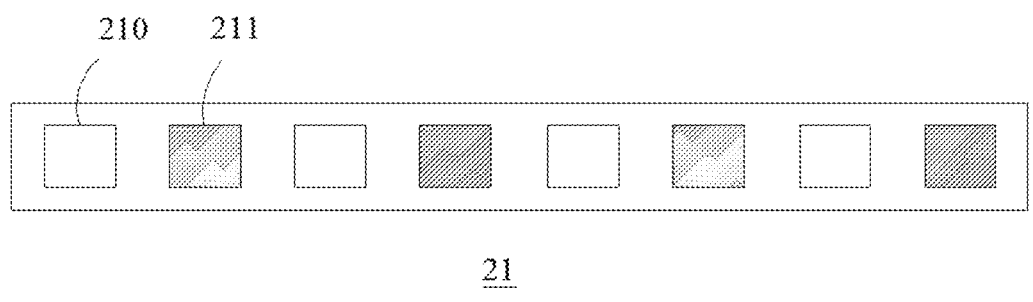
FIG. 2 is a schematic structural view of the backlight of the liquid crystal display illustrated in FIG. 1.

Referring to FIGS. 1 and 2, the liquid crystal display in this embodiment includes an edge type and a direct type. The edge type liquid crystal display includes a display module 1 and a backlight module 2. The backlight module 2 includes a backlight source 21, a light guide plate 22, a reflection sheet 23 and an optical film set 24. The backlight source 21 is disposed opposite to a light incident surface of the light guide plate 22. The reflection sheet 23 is disposed on a bottom of the light guide plate 22. The optical film set 24 is disposed on a top of the light guide plate 22, the display module 1 is disposed on the top of the optical film set 24. The backlight source 21 in the edge type liquid crystal display is a LED light bar that is a plurality of LEDs is disposed on a PCB of the backlight source 21 at a linear interval. Each LED includes a blue light chip and an encapsulation structure for encapsulating the blue light chip, here, the plurality of LEDs respectively corresponds to the first light emitting unit 210 and the second light emitting unit 211.

Figure 3:
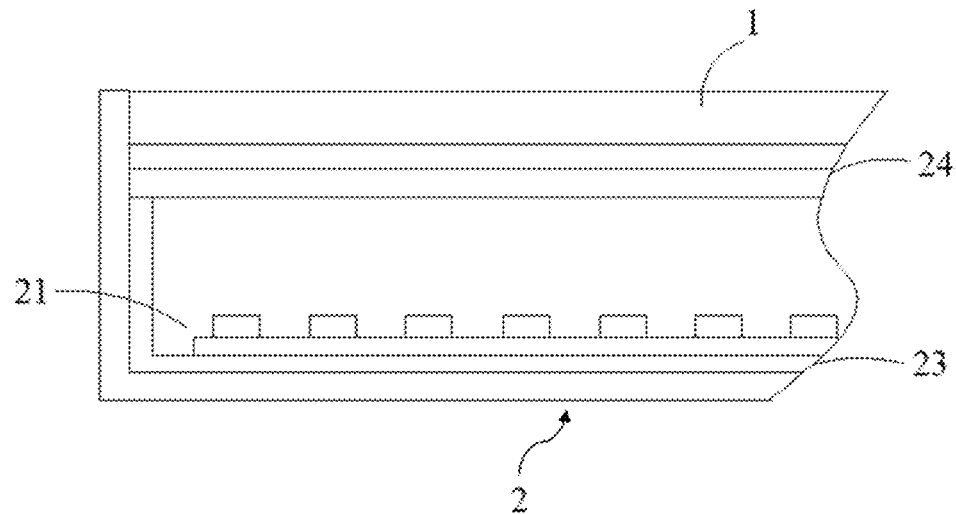
FIG. 3 is another schematic structural view of the liquid crystal display.
Figure 4:
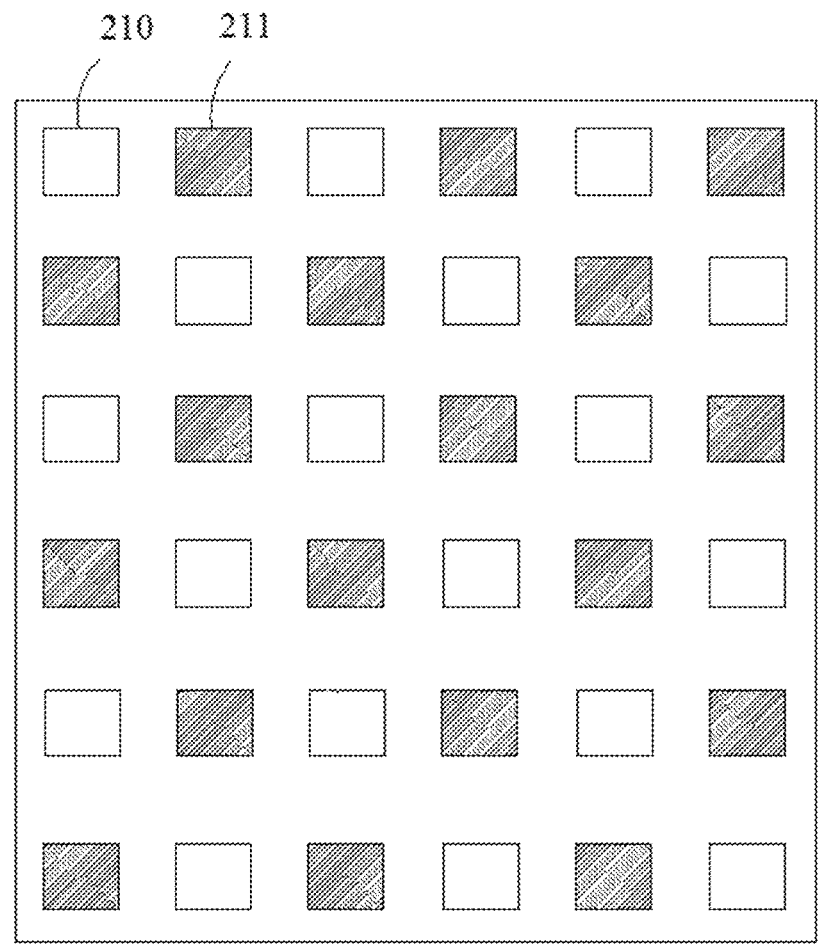
FIG. 4 is a schematic structural view of the backlight of the liquid crystal display illustrated in FIG. 3.

Referring to FIGS. 3 and 4, the direct type liquid crystal display includes a display module 1 and a backlight module 2. The backlight module 2 includes a backlight source 21, a reflection sheet 23 and an optical film set 24. The backlight source 21 is disposed on a bottom of the optical film set 24, the reflection sheet 23 is disposed on a bottom of the backlight source 21, and the display module 1 is disposed on a top of the optical film set 24, as shown in FIG. 3. The optical film set 24 includes a diffusion sheet, a brightness enhancement film, and the like. The backlight source 21 in the direct type liquid crystal display is an LED array, that is, a plurality of LEDs is arranged in a matrix, the number of rows of the matrix is not less than 10, the number of columns is not less than 6, the plurality of LEDs correspond to the first light emitting unit 210 and the second light emitting unit 211.

Specifically, the first light emitting unit 210 includes a first blue light chip and a encapsulation structure for encapsulating the first blue light chip, the second light emitting unit 211 includes a second blue light chip and a encapsulation structure for encapsulating the second blue light chip, wherein an emission peak of the second blue light chip is larger than the emission peak of the first blue light chip, the emission peak of the first blue light chip is 457~465 nm, and the emission peak of the second blue light chip is 466~475 nm.

The light emitted by the first blue light chip and the second blue light chip is blue light, inner surfaces of the encapsulation structure for encapsulating the first blue light chip and the encapsulation structure for encapsulating the second blue light chip is coated with a fluorescent material, the fluorescent material is excited by the blue light to generate different colors of light. The light of different colors is mixed with the remaining blue light to obtain white light, so that the light emitted from the backlight source 21 is white light.

The LEDs in this embodiment may be single-crystal LEDs or dual-crystal LEDs. In the edge type liquid crystal display, the first light emitting unit 210 and the second light emitting unit 211 are dual-crystal LEDs, that is, the first light emitting unit 210 includes two first blue light chips, and the second light emitting unit 211 includes two second blue light chips. The two first blue light chips in the first light emitting unit 210 are encapsulated by one encapsulation structure. Similarly, the two second blue light chips in the second light emitting unit 211 are encapsulated by one encapsulation structure. This can increase the backlight brightness of the edge type liquid crystal display. In the direct type liquid crystal display, the first light emitting unit 210 and the second light emitting unit 211 are both single-crystal LEDs, that is, the first light emitting unit 210 includes one first blue light chip and the second light emitting unit 211 includes one second blue light chip.

The arrangement of the first light emitting unit 210 and the second light emitting unit 211 in the backlight source 21 is as uniform as possible, in this way, when performing a division of the backlight source 21, at least one first light emitting unit 210 and one second light emitting unit 211 may be included in each backlight location. Preferably, the first light emitting units 210 and the second light emitting units 211 are alternately arranged, so as to ensure that the numbers of the first light emitting units 210 and the second light emitting units 211 in each backlight location are as equal as possible.

Figure 5:
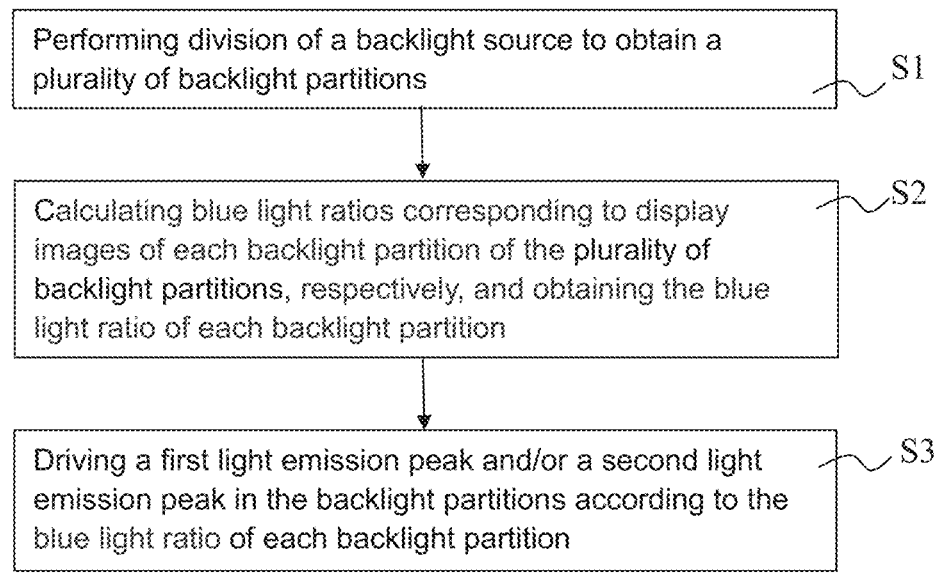
FIG. 5 is a flowchart of a display method for the low blue light.

Referring to FIG. 5, the following describes in detail the display method for a low blue light of the liquid crystal display of the present embodiment. The display method for the low blue light includes the following steps:

S1, performing division of a backlight source 21 to obtain a plurality of backlight locations, wherein the backlight locations are divided according to interface requirements and size of the driving circuit, for a small-sized surface light source, the number of the backlight locations is 100~1000, the plurality of backlight locations includes a first emission peak and a second emission peak, the first emission peak is the emission peak of the first blue light chip, and the second emission peak is the emission peak of the second blue light chip.

S2, calculating blue light ratios corresponding to display images of each backlight location of the plurality of backlight locations, respectively, and obtaining the blue light ratio of each backlight location, the blue light ratio refers to the ratio of the spectral energy of the wavelength of 380 nm-500 nm in the image corresponding to the backlight location to the spectral energy of the entire image;

S3, driving the first light emission peak and/or the second light emission peak in the backlight location according to the blue light ratio of each backlight location, that is, driving the first blue light chip of the first light emitting unit 210 and the second blue light chip of the second light emitting unit 211 in the backlight location according to the blue light ratio of each backlight location, the driving method here includes driving only the first blue light chip of the first light emitting unit 210, only driving the second blue light chip of the second light emitting unit 211, and driving the first blue light chip of the first light emitting unit 210, and the second blue light chip of the second light emitting unit 211, simultaneously.

The number of the backlight locations in this embodiment is determined according to the total number of the first light emitting units and the second light emitting units, the number of driving units for driving the first blue light chip and the second blue light chip, and the requirement of the display image quality of the liquid crystal display, the more of the total number of the first light emitting units and the second light emitting units, the more the number of the backlight locations is. In this embodiment, for the edge type liquid crystal display, the number of backlight locations is four to six, for the direct type liquid crystal display, the number of backlight locations is six to ten.

Specifically, step S3 specifically includes:

S31, judging whether the blue light ratio of each backlight location is greater than a first threshold;

S32, driving the second blue light chip in the backlight location, if the blue light ratio of the backlight location is greater than the first threshold.

S33, judging whether the blue light ratio of the backlight location is greater than a second threshold, if the blue light ratio of the backlight location is not greater than the first threshold;

S34, driving the first blue light chip and the second blue light chip in the backlight location, if the blue light ratio of the backlight location is greater than the second threshold;

S35, driving the first blue light chip in the backlight location, if the blue light ratio of the backlight location is not greater than the second threshold;

In this embodiment, the first threshold is 80%, the second threshold is 20%, and Step S3 specifically includes:

S31, judging whether the blue light ratio of each backlight location is greater than 80%;

S32, driving the second blue light chip in the backlight location, if the blue light ratio of the backlight location is greater than 80%, wherein the second blue light chip is driven by a pulse sequence of a larger duty ratio, to ensure the brightness of the image of the liquid crystal display, and to achieve a higher level of low blue light display;

S33, judging whether the blue light ratio of the backlight location is greater than a second threshold, if the blue light ratio of the backlight location is not greater than 80%;

S34, driving the first blue light chip and the second blue light chip in the backlight location, if the blue light ratio of the backlight location is greater than 20%;

S35, driving the first blue light chip in the backlight location, if the blue light ratio of the backlight location is not greater than 20%, wherein, when only the first blue light chip is driven, the blue light ratio in the image of the liquid crystal display is small, so as to realize the low blue light display and to ensure the white point color coordinate and display color gamut of the image of the liquid crystal display to the utmost extent simultaneously.

Specifically, step S34 includes:

S341, judging whether the blue light ratio of the backlight location is greater than a third threshold;

S342, if the blue light ratio of the backlight location is greater than the third threshold, driving the first blue light chip in the backlight location according to the first pulse sequence, and driving the second blue light chip in the backlight location according to the second pulse sequence, the duty ratio of the first pulse sequence is smaller than the duty ratio of the second pulse sequence;

S343, if the blue light ratio of the backlight location is not greater than the third threshold, driving the first blue light chip in the backlight location according to the third pulse sequence, and driving the second blue light chip in the backlight location according to the fourth pulse sequence, the duty ratio of the third pulse sequence is greater than the duty ratio of the fourth pulse sequence.

In this embodiment, the third threshold is 45%~50%. In step S342, the duty ratio of the first pulse sequence is 45%~50% of the duty ratio of the second pulse sequence; in step S343, the duty ratio of the fourth pulse sequence is 45%~50% of the duty ratio of the third pulse sequence, and the step S34 specifically includes:

S341, judging whether the blue light ratio of the backlight location is greater than 50%;

S342, if the blue light ratio of the backlight location is greater than 50%, driving the first blue light chip in the backlight location according to the first pulse sequence, driving the second blue light chip in the backlight location according to the second pulse sequence, and the duty ratio of the first pulse sequence is 50% of the duty ratio of the second pulse sequence;

S343, if the blue light ratio of the backlight location is not greater than 50%, driving the first blue light chip in the backlight location according to the third pulse sequence, and driving the second blue light chip in the backlight location according to the fourth pulse sequence, and the duty ratio of the fourth pulse sequence is 50% of the duty ratio of the third pulse sequence. In step S34, the first blue light chip and the second blue light chip are driven in a synchronous manner. The first pulse sequence and the second pulse sequence simultaneously drive the first blue light chip and the second blue light chip, similarly, the third pulse sequence and the fourth pulse sequence simultaneously drive the first blue light chip and the second blue light chip.

In this embodiment, the first blue light chip and the second blue light chip may also be driven by asynchronous driving manner in step S34, the specific driving manner is as follows:

S341, judging whether the blue light ratio of the backlight location is greater than the third threshold;

S342, if the blue light ratio of the backlight location is greater than the third threshold, driving the first blue light chip in the backlight location according to a fifth pulse sequence, and driving the second blue light chip in the backlight location according to the sixth pulse sequence, a duty ratio of the fifth pulse sequence is equal to the duty ratio of the sixth pulse sequence, an intensity of the fifth pulse sequence is less than the intensity of the sixth pulse sequence;

S343, if the blue light ratio of the backlight location is not greater than the third threshold, driving the first blue light chip in the backlight location according to a seventh pulse sequence, and driving the second blue light chip in the backlight location according to an eighth pulse sequence, the cycle of the seventh pulse sequence is equal to the cycle of the eighth pulse sequence, the intensity of the seventh pulse sequence is greater than the intensity of the eighth pulse sequence.

Figure 6:
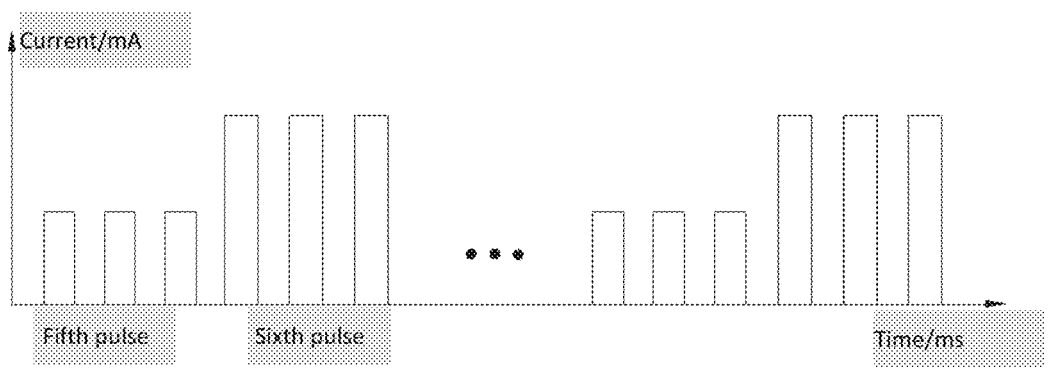
FIG. 6 is a pulse diagram of the asynchronous driving.

In this embodiment, the third threshold is 50%. In step S342, the intensity of the fifth pulse sequence is 50% of the intensity of the sixth pulse sequence. In step S343, the intensity of the eighth pulse sequence is 50% of the intensity of the seventh pulse sequence, the illustration of the fifth pulse sequence and the sixth pulse sequence are shown in FIG. 6, the seventh pulse sequence and the eighth pulse sequence are similar to the fifth pulse sequence and the sixth pulse sequence, and the step S34 specifically includes:

S341, judging whether the blue light ratio of the backlight location is greater than 50%;

S342, if the blue light ratio of the backlight location is greater than 50%, driving the first blue light chip in the backlight location according to the fifth pulse sequence, and driving the second blue light chip in the backlight location according to the sixth pulse sequence, the duty ratio of the fifth pulse sequence is equal to the duty ratio of the sixth pulse sequence, the intensity of the fifth pulse sequence is 50% of the intensity of the sixth pulse sequence;

S343, if the blue light ratio of the backlight location is not greater than 50%, driving the first blue light chip in the backlight location according to the seventh pulse sequence, and driving the second blue light chip in the backlight location according to the eighth pulse sequence, the cycle of the seventh pulse sequence is equal to the cycle of the eighth pulse sequence, and the intensity of the eighth pulse sequence is 50% of the intensity of the seventh pulse sequence.

In the asynchronous driving mode, all of the cycles of the fifth pulse sequence, the sixth pulse sequence, the seventh pulse sequence, and the eighth pulse sequence are not greater than 200 ms, because the minimum human eye persistence time is 200 ms, by setting the cycles of the fifth pulse sequence, the sixth pulse sequence, the seventh pulse sequence, and the eighth pulse sequence are all to be no less than 200 ms, to ensure the liquid crystal display device achieving a higher level of low blue light display, while ensuring the white point coordinate and the dolor gamut of the image of the liquid crystal display not having much changing simultaneously.

The display method for the low blue light in this embodiment obtains a plurality of backlight locations by dividing the backlight source, and then adjusts the brightness of the first blue light chip and the second blue light chip in each backlight location according to the blue light ratio of each backlight location, so as to adjust the balance between the blue light wavelength, the brightness, the color gamut and the white point coordinate of the image of the liquid crystal display, and avoids the serious distortion of the image caused by the overall adjustment of the backlight.

Table 1 shows the RGBW color point coordinate and the NTSC color gamut simulation results of the first blue light chip and the second blue light chip under different light emission peaks. From the simulation results, it can be seen that when the emission peak is shifted from 460 nm to 469 nm, the NTSC color gamut of the liquid crystal device decreased from 99.6% to 94.2%, the color gamut belongs to the high gamut degree of the display area, the white point coordinate changes from (0.324,0.369) to (0.314,0.368), the impact to the white point coordinate and color gamut degree is limited with the emission peak redshifted 9 nm, and not generate a serious visual color shift, therefore, the present embodiment can ensure that the white point coordinate is not shifted and the display color gamut does not decrease when the short-wavelength blue light energy is reduced. It can also be seen from Table 1, when the emission peak of the first blue light chip and the second blue light chip is at 457 nm to 469 nm, the more eye-protective low blue display under the premise of not reducing the color gamut can be achieved.

TABLE 1

| | nm | | | | | | |
| --- | --- | --- | --- | --- | --- | --- | --- |
| Wp | 447 | 450 | 453 | 457 | 460 | 464 | 469 |
| $R_x$ | 0.685 | 0.685 | 0.685 | 0.687 | 0.687 | 0.687 | 0.688 |
| $R_y$ | 0.313 | 0.313 | 0.313 | 0.312 | 0.311 | 0.311 | 0.310 |
| $G_x$ | 0.237 | 0.237 | 0.235 | 0.232 | 0.228 | 0.221 | 0.210 |

TABLE 1-continued

| | nm | | | | | | |
|---|---|---|---|---|---|---|---|
| Wp | 447 | 450 | 453 | 457 | 460 | 464 | 469 |
| $G_y$ | 0.719 | 0.718 | 0.715 | 0.709 | 0.699 | 0.689 | 0.675 |
| $B_x$ | 0.151 | 0.149 | 0.146 | 0.141 | 0.135 | 0.129 | 0.122 |
| $B_y$ | 0.086 | 0.086 | 0.082 | 0.083 | 0.091 | 0.100 | 0.118 |
| $W_x$ | 0.330 | 0.330 | 0.319 | 0.321 | 0.324 | 0.313 | 0.314 |
| $W_y$ | 0.420 | 0.415 | 0.393 | 0.376 | 0.369 | 0.363 | 0.368 |
| NTSC | 100.6% | 100.6% | 101.5% | 101.3% | 99.6% | 97.6% | 94.2% |

Figure 7:
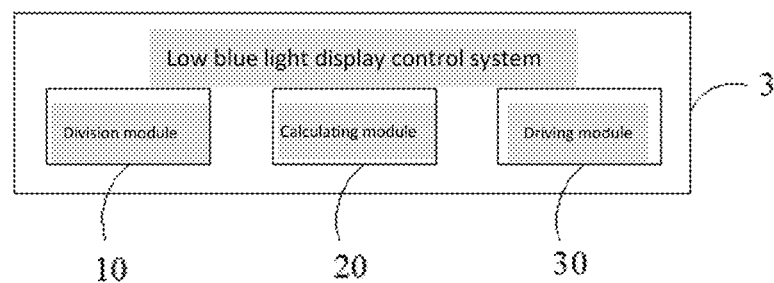
FIG. 7 is a schematic diagram of the structure of a low blue light display control system.

Referring to FIG. 7, the liquid crystal display of the present embodiment further includes a low blue light display control system 3. The low blue light display control system 3 includes a division module 10, a calculation module 20, and a driving module 30. The division module 10 is configured to divide the backlight source to obtain a plurality of backlight locations. The calculating module 20 is configured to calculate blue light ratios corresponding to display images of each backlight location of the plurality of backlight locations, respectively, and obtaining the blue light ratio of each backlight location. The driving module 30 is configured to drive the first blue light chip and/or the second blue light chip in the backlight location according to the blue light ratio of each backlight location.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A display method for a low blue light of a liquid crystal display comprising the steps of:
performing division of a backlight source to obtain a plurality of backlight locations, wherein the plurality of backlight locations comprises a first emission peak and/or a second emission peak, and the second emission peak is larger than the second emission peak;
calculating blue light ratios corresponding to display images of each backlight location of the plurality of backlight locations, respectively, and obtaining the blue light ratio of each backlight location; and
driving a first light emission peak and/or a second light emission peak in the backlight location according to the blue light ratio of each backlight location;
wherein the step of driving the first light emission peak and/or the second light emission peak in the backlight location according to the blue light ratio of each backlight location specifically comprises:
judging whether the blue light ratio of each backlight location is greater than a first threshold;
driving the second light emission peak in the backlight location, if the blue light ratio of the backlight location is greater than the first threshold;
judging whether the blue light ratio of the backlight location is greater than a second threshold, if the blue light ratio of the backlight location is not greater than the first threshold;
driving the first light emission peak and the second light emission peak in the backlight location, if the blue light ratio of the backlight location is greater than the second threshold; and
driving the first light emission peak in the backlight location, if the blue light ratio of the backlight location is not greater than the second threshold.

2. The display method for the low blue light according to claim 1, wherein the first emission peak is 457~465 nm, and the second emission peak is 466~475 nm.

3. The display method for the low blue light according to claim 1, wherein the step of driving the first light emission peak and the second light emission peak in the backlight location, if the blue light ratio of the backlight location is greater than the second threshold specifically comprises:
judging whether the blue light ratio of the backlight location is greater than a third threshold;
if the blue light ratio of the backlight location is greater than the third threshold, driving the first light emission peak in the backlight location according to a first pulse sequence, and driving the second light emission peak in the backlight location according to a second pulse sequence, a duty ratio of the first pulse sequence is smaller than the duty ratio of the second pulse sequence; and
if the blue light ratio of the backlight location is not greater than the third threshold, driving the first light emission peak in the backlight location according to the third pulse sequence, and driving the second light emission peak in the backlight location according to the fourth pulse sequence, the duty ratio of the third pulse sequence is greater than the duty ratio of the fourth pulse sequence.

4. The display method for the low blue light according to claim 1, wherein the step of driving the first light emission peak and the second light emission peak in the backlight location, if the blue light ratio of the backlight location is greater than the second threshold specifically comprises:
judging whether the blue light ratio of the backlight location is greater than the third threshold;
if the blue light ratio of the backlight location is greater than the third threshold, driving the first light emission peak in the backlight location according to a fifth pulse sequence, and driving the second light emission peak in the backlight location according to a sixth pulse sequence, a duty ratio of the fifth pulse sequence is equal to the duty ratio of the sixth pulse sequence, an intensity of the fifth pulse sequence is less than the intensity of the sixth pulse sequence; and
if the blue light ratio of the backlight location is not greater than the third threshold, driving the first light emission peak in the backlight location according to a seventh pulse sequence, and driving the second light emission peak in the backlight location according to an eighth pulse sequence, the duty ratio of the seventh pulse sequence is equal to the duty ratio of the eighth pulse sequence, an intensity of the seventh pulse sequence is greater than the intensity of the eighth pulse sequence.

5. A liquid crystal display comprising a backlight source and a low blue light display controller, the backlight source comprising a plurality of first light emitting units and a plurality of second light emitting units, the first light emitting units comprises first blue light chips, the second light emitting units comprises second blue light chips, an emission peak of the second blue light chips is larger than the emission peak of the first blue light chips; wherein the low blue light display controller is configured to:
- divide a backlight source to obtain a plurality of backlight locations, the plurality of backlight locations comprises a first emission peak and a second emission peak, and the second emission peak is larger than the second emission peak;
- calculate blue light ratios corresponding to display images of each backlight location of the plurality of backlight locations, respectively, and obtain the blue light ratio of each backlight location; and
- drive a first light emission peak and/or a second light emission peak in the backlight location according to the blue light ratio of each backlight location;
- wherein driving the first light emission peak and/or the second light emission peak in the backlight location according to the blue light ratio of each backlight location specifically comprises:
- judging whether the blue light ratio of each backlight location is greater than a first threshold;
- driving the second light emission peak in the backlight location, if the blue light ratio of the backlight location is greater than the first threshold;
- judging whether the blue light ratio of the backlight location is greater than a second threshold, if the blue light ratio of the backlight location is not greater than the first threshold;
- driving the first light emission peak and the second light emission peak in the backlight location, if the blue light ratio of the backlight location is greater than the second threshold; and
- driving the first light emission peak in the backlight location, if the blue light ratio of the backlight location is not greater than the second threshold.

6. The liquid crystal display according to claim 5, wherein the first emission peak is 457~465 nm, and the second emission peak is 466~475 nm.

7. The liquid crystal display according to claim 5, wherein the plurality of first light emitting units and the plurality of second light emitting units are arranged in a matrix, and the first light emitting units and the second light emitting units are alternately arranged.

8. The liquid crystal display according to claim 5, wherein the first light emitting unit comprises a first blue light chip, the second light emitting unit comprises a second blue light chip, or the second light emitting unit comprises two first blue light chips, and the second light emitting unit comprises two second blue light chips.

9. The display method for the low blue light according to claim 5, wherein driving the first light emission peak and the second light emission peak in the backlight location, if the blue light ratio of the backlight location is greater than the second threshold specifically comprises:
- judging whether the blue light ratio of the backlight location is greater than a third threshold;
- if the blue light ratio of the backlight location is greater than the third threshold, driving the first light emission peak in the backlight location according to a first pulse sequence, and driving the second light emission peak in the backlight location according to a second pulse sequence, a duty ratio of the first pulse sequence is smaller than the duty ratio of the second pulse sequence; and
- if the blue light ratio of the backlight location is not greater than the third threshold, driving the first light emission peak in the backlight location according to the third pulse sequence, and driving the second light emission peak in the backlight location according to the fourth pulse sequence, the duty ratio of the third pulse sequence is greater than the duty ratio of the fourth pulse sequence.

10. The display method for the low blue light according to claim 5, wherein driving the first light emission peak and the second light emission peak in the backlight location, if the blue light ratio of the backlight location is greater than the second threshold specifically comprises:
- judging whether the blue light ratio of the backlight location is greater than the third threshold;
- if the blue light ratio of the backlight location is greater than the third threshold, driving the first light emission peak in the backlight location according to a fifth pulse sequence, and driving the second light emission peak in the backlight location according to a sixth pulse sequence, a duty ratio of the fifth pulse sequence is equal to the duty ratio of the sixth pulse sequence, an intensity of the fifth pulse sequence is less than the intensity of the sixth pulse sequence; and
- if the blue light ratio of the backlight location is not greater than the third threshold, driving the first light emission peak in the backlight location according to a seventh pulse sequence, and driving the second light emission peak in the backlight location according to an eighth pulse sequence, the duty ratio of the seventh pulse sequence is equal to the duty ratio of the eighth pulse sequence, an intensity of the seventh pulse sequence is greater than the intensity of the eighth pulse sequence.

\* \* \* \* \*